(12) United States Patent
Kfir et al.

(10) Patent No.: US 11,785,033 B2
(45) Date of Patent: Oct. 10, 2023

(54) DETECTING UNUSED, ABNORMAL PERMISSIONS OF USERS FOR CLOUD-BASED APPLICATIONS USING A GENETIC ALGORITHM

(71) Applicant: Zscaler, Inc., San Jose, CA (US)

(72) Inventors: Arik Kfir, Kfar-Saba (IL); Nadav Pozmantir, Hod-Hasharon (IL); Hila Paz Herszfang, Tel-Aviv (IL)

(73) Assignee: Zscaler, Inc., San Jose, CA (US)

( * ) Notice: Subject to any disclaimer, the term of this patent is extended or adjusted under 35 U.S.C. 154(b) by 317 days.

(21) Appl. No.: 17/343,887

(22) Filed: Jun. 10, 2021

(65) Prior Publication Data

US 2022/0400128 A1 Dec. 15, 2022

(51) Int. Cl.
*H04L 29/06* (2006.01)
*H04L 9/40* (2022.01)
*G06N 3/126* (2023.01)

(52) U.S. Cl.
CPC ......... *H04L 63/1425* (2013.01); *G06N 3/126* (2013.01)

(58) Field of Classification Search
CPC ............................ H04L 63/1425; G06N 3/126
See application file for complete search history.

(56) References Cited

U.S. PATENT DOCUMENTS

| | | | |
|---|---|---|---|
| 11,075,933 B1* | 7/2021 | Fetters | H04W 12/64 |
| 11,411,980 B2* | 8/2022 | Triantafillos | H04L 67/535 |
| 11,621,966 B1* | 4/2023 | Yu | G06N 20/00 |
| | | | 726/23 |
| 2010/0250726 A1 | 9/2010 | Moses et al. | |
| 2016/0119364 A1* | 4/2016 | Zolli | G06Q 50/01 |
| | | | 726/26 |
| 2018/0359270 A1* | 12/2018 | Chari | H04L 63/102 |
| 2019/0311367 A1* | 10/2019 | Reddy | G06Q 20/4016 |
| 2020/0137109 A1* | 4/2020 | Endler | H04L 63/083 |
| 2021/0157907 A1* | 5/2021 | Argoety | H04L 63/1425 |

* cited by examiner

*Primary Examiner* — Ka Shan Choy
(74) *Attorney, Agent, or Firm* — Baratta Law PLLC; Lawrence A. Baratta, Jr.

(57) ABSTRACT

Systems and methods include obtaining unused user accounts associated with a cloud application where an unused user account is one where a corresponding user has not accessed the cloud application in a certain period of time; determining a subset of the unused user accounts that are abnormal user accounts, wherein an abnormal user account is one that is anomalous compared to similar users; scoring and ranking the unused and abnormal user accounts; and remediating a set of the ranked unused and abnormal user accounts.

17 Claims, 5 Drawing Sheets

DETECTING UNUSED, ABNORMAL PERMISSIONS OF USERS FOR CLOUD-BASED APPLICATIONS USING A GENETIC ALGORITHM

FIELD OF THE DISCLOSURE

The present disclosure generally relates to computer networking systems and methods. More particularly, the present disclosure relates to systems and methods for detecting unused, abnormal permissions of users for cloud-based applications using a genetic algorithm.

BACKGROUND OF THE DISCLOSURE

The traditional view of an enterprise network (i.e., corporate, private, etc.) included a well-defined perimeter defended by various appliances (e.g., firewalls, intrusion prevention, advanced threat detection, etc.). In this traditional view, Information Technology (IT) had complete control of applications, services, and resources located within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet.

The trend of applications moving to the cloud continues and each enterprise user can have dozens of more accounts for cloud applications. For example, an enterprise user may have a need for access to a specific cloud application for a singular purpose. The user may perform this purpose and not need the access any further. In practice, there can be millions of accounts for enterprise users of tens or hundreds of different cloud applications. The typical approach to account management is to remove unused or unconsumed permissions. For example, lock or delete accounts where users have not logged in for a certain period of time. However, this can lead to unnecessary churn and poor user experience where users access applications occasionally. Further, due to the sheer number of user accounts, it is impractical to manage each account individually.

BRIEF SUMMARY OF THE DISCLOSURE

The present disclosure relates to systems and methods for detecting unused, abnormal permissions of users for cloud-based applications using a genetic algorithm. Specifically, the present disclosure looks for unconsumed permissions that are anomalous compared to similar users and can include locking/deactivating these cloud accounts, removing unconsumed permissions from the account, etc. This is an automated approach to provide safe removal of unused assignments as well as ranking unused, abnormal assignments, enabling IT to focus attention.

The present disclosure can include a method including steps, a server configured to implement the steps, and a non-transitory computer-readable medium with instructions that cause processors to implement the steps. The steps include obtaining unused user accounts associated with a cloud application where an unused user account is one where a corresponding user has not accessed the cloud application in a certain period of time; determining a subset of the unused user accounts that are abnormal user accounts, wherein an abnormal user account is one that is anomalous compared to similar users; scoring and ranking the unused and abnormal user accounts; and remediating a set of the ranked unused and abnormal user accounts.

The similar users can be ones that have commonality in any of department, location, and job function, and wherein anomalous means a user has different permissions from corresponding similar users. The abnormal user accounts can be determined using a genetic algorithm. The genetic algorithm determines assignment based communities and determines a distance therebetween, with the abnormal user accounts being based on the distance. The genetic algorithm utilizes communities based on any of assignments, entitlements, behavior attributes, and meta attributes. The genetic algorithm utilizes a bipartite graph between users and assignments, converts the bipartite graph to a bitmap, determines communities based on the bitmap, computes a relational weight of each community, and computes distances among the community using the relational weight. The scoring can be based on a combination of extra granted assignments, assignment counts, and permitted actions.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

The present disclosure relates to systems and methods for detecting unused, abnormal permissions of users for cloud-based applications using a genetic algorithm. Specifically, the present disclosure looks for unconsumed permissions that are anomalous compared to similar users and can include locking/deactivating these cloud accounts, removing unconsumed permissions from the account, etc. This is an automated approach to provide safe removal of unused assignments as well as ranking unused, abnormal assignments, enabling IT to focus attention. as well as ranking unused, abnormal assignments, enabling IT to focus attention.

Example Cloud-Based System Architecture

Figure 1:
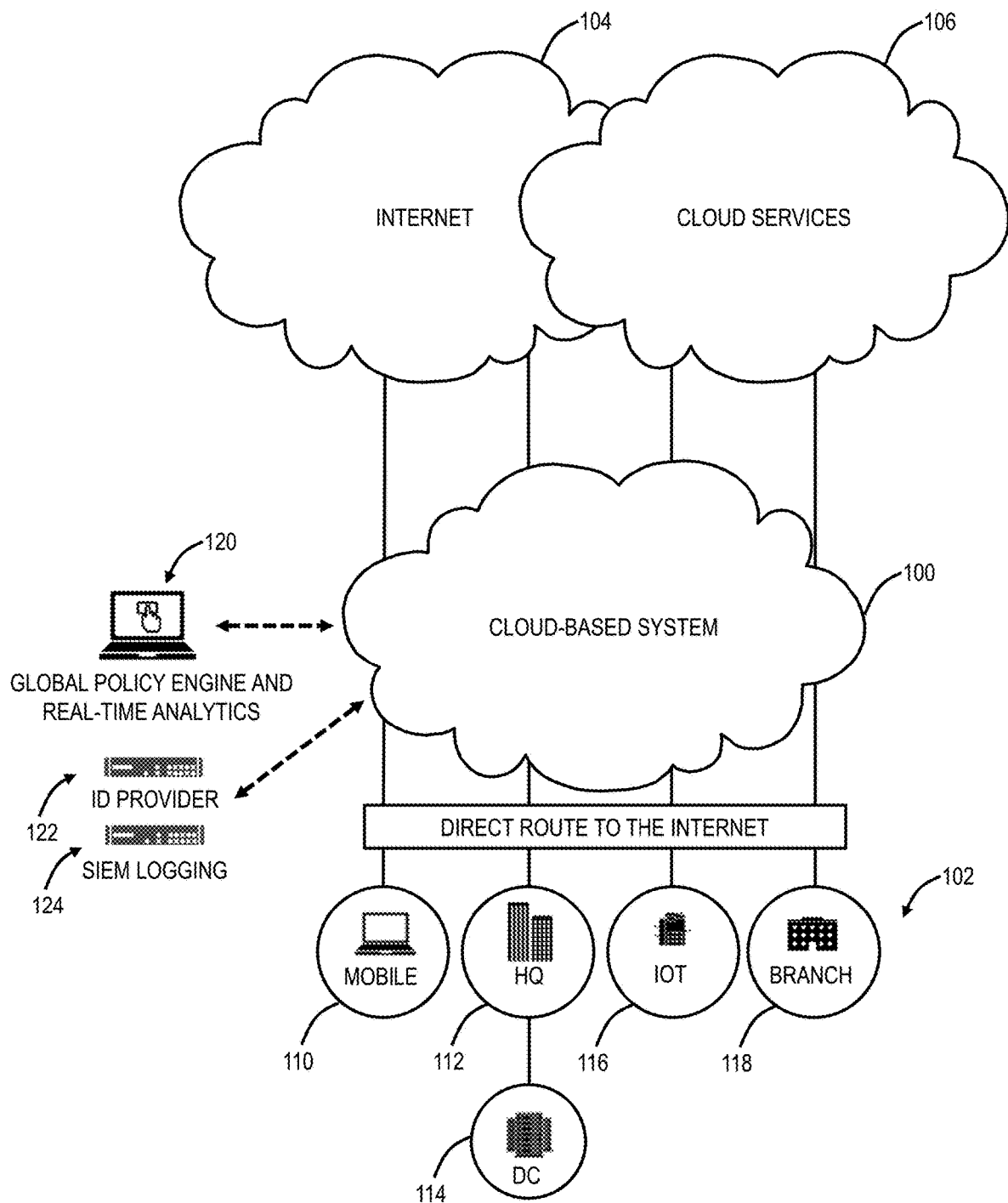
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
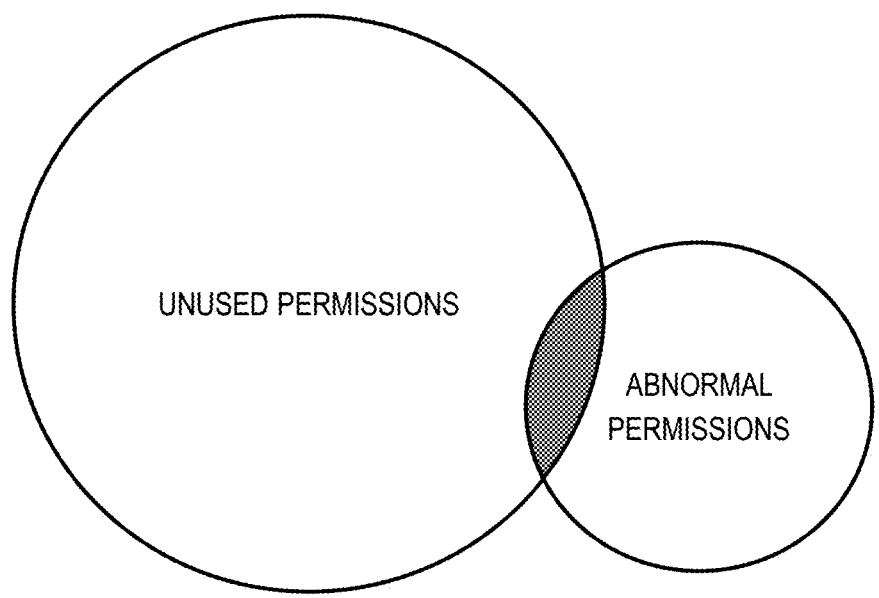
FIG. 5 is a Venn diagram illustrating the relationship between unused permissions and abnormal permissions.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
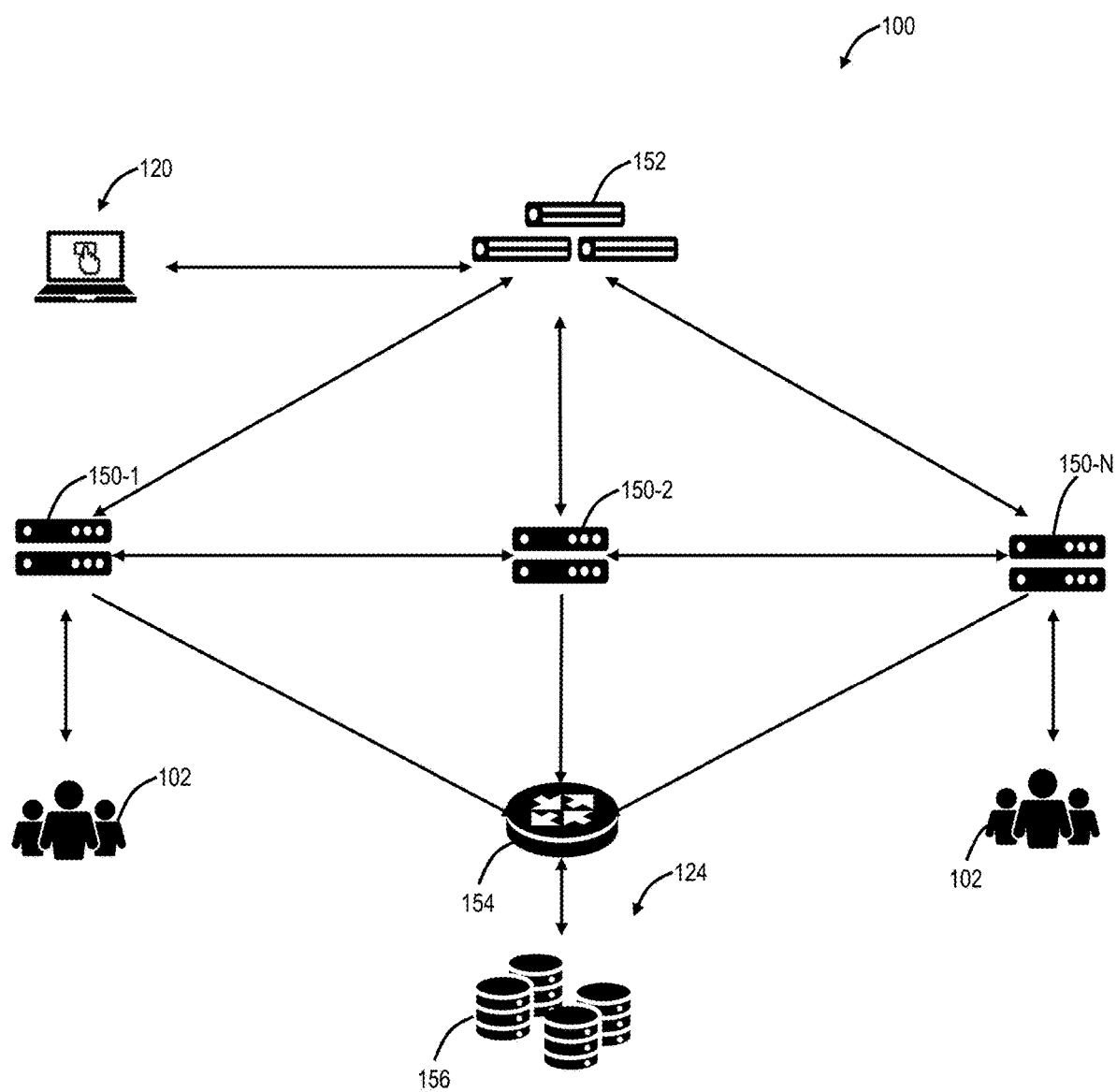
FIG. 2 is a network diagram of an example implementation of the cloud-based system.
Figure 4:
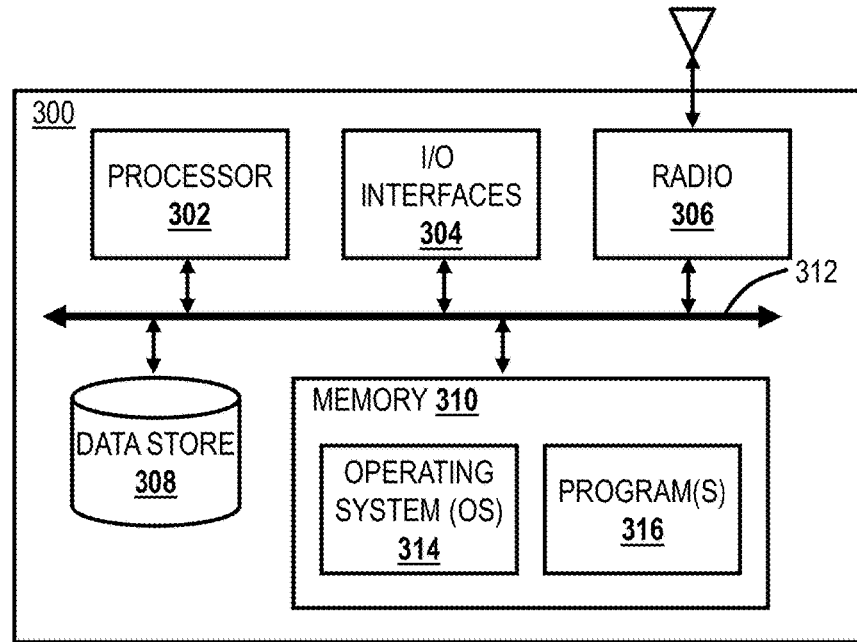

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Other examples of cloud applications can include, for example, Amazon Web Services (AWS), Microsoft Azure, Google Cloud, Salesforce, Box, Dropbox, and the like.

Example Server Architecture

Figure 3:
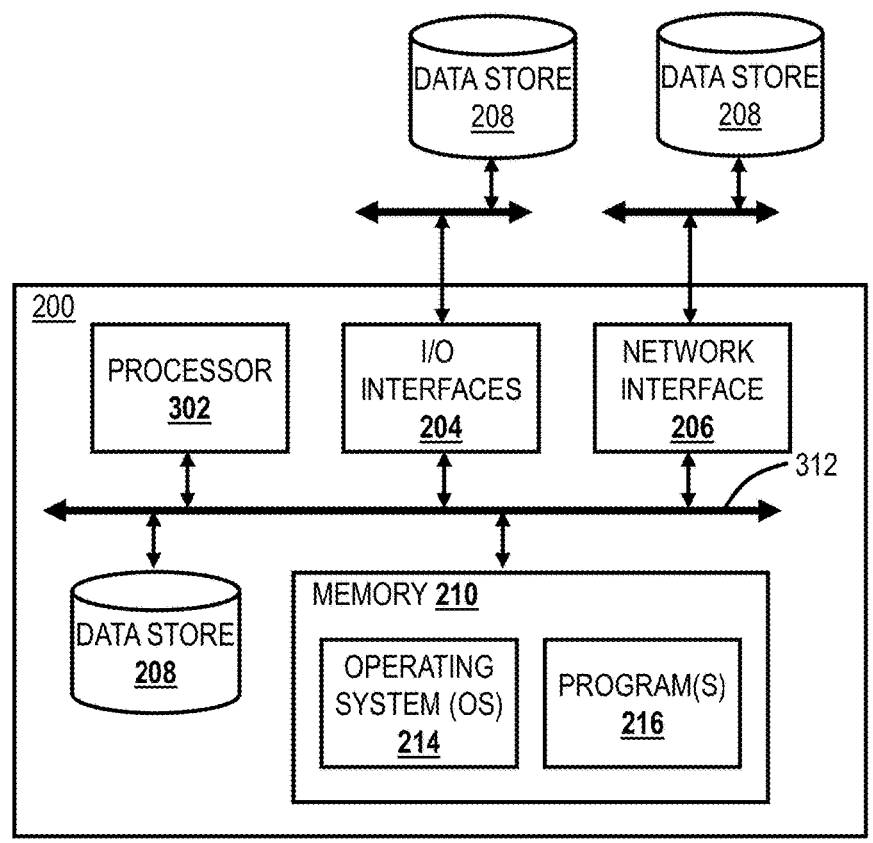
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Definitions

The following are definitions used herein.

A user account provides the ability to use a cloud application for a specific user at some privilege level. The user account can include credentials, e.g., login ID and password. The term user account can be used along with assignment, permission, etc. The users 102 are associated with a tenant and can each have some mechanism to differentiate between users, such as, e.g., job functions, title, group or department, location, etc. Also, the user account can be a specific machine, i.e., user device 300.

An unused user account is one where the underlying user has not logged in for a certain period of time. This can also be referred to as unconsumed permissions, assignments, etc.

An abnormal user account is one where the underlying user has a set of permissions that are anomalous compared to similar users.

Permissions define a scope of a user account in the given cloud application. The term attributes can also be used interchangeably with permissions.

FIG. 5 is a Venn diagram illustrating the relationship between unused permissions and abnormal permissions. Specifically, the present disclosure contemplates identifying and remediating user accounts that are both unused and abnormal. Unused user accounts can be identified as is known in the art, namely a user has not accessed the account in a given period of time. Abnormal user accounts are identified via a genetic algorithm described as follows. Where a typical manual account has hundreds of thousands of different permissions to cloud resources, it is not likely for the account to access all resources frequently. The intersection of abnormal and unused permissions suggests an untypical security approach to an individual user that may put the organization in much higher risk than infrequent used resources.

Dimension-Based Communities

A dimension-based community of accounts in a given cloud application is defined as a group of users (and/or machines) which have the exact (or, nearly exact) set of attributes in one (or more) of a given dimension. The dimensions can include 1) assignments, 2) entitlements, 3) behavior attributes, and 4) meta attributes.

The assignments can be a unique key for a permission on a resource/group of resources, e.g., unique policies on unique resources.

The entitlements are actions that a user can perform on a given resource, e.g., the permission to perform a given action on a given unique resource.

The behavior attributes can include performing a resource action with a given frequency.

The meta attributes can differentiate users, such as department, domain email, manager, etc.

Figure 6:
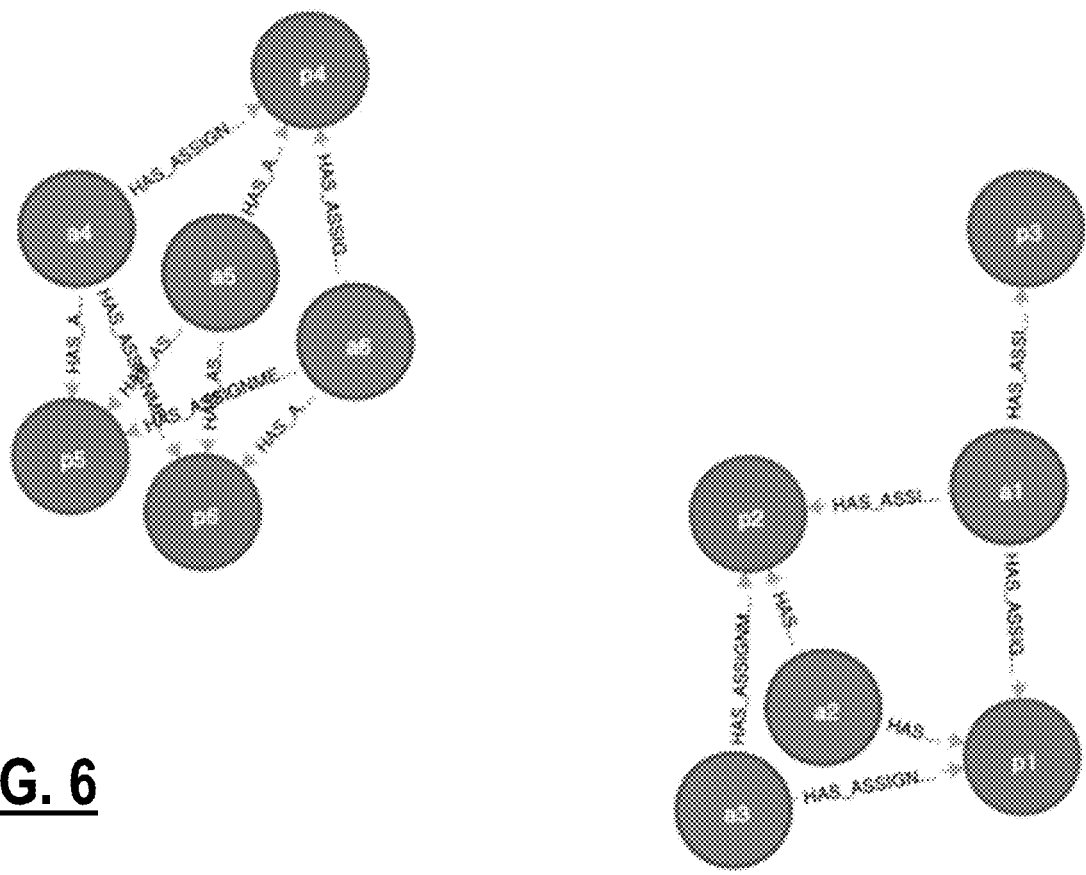
FIG. 6 is an example of a bipartite graph of user accounts and assignments.

These can all be referred to as dimensions. The present disclosure includes each dimension reflecting a bipartite graph. FIG. 6 is an example of a bipartite graph of user accounts and assignments. For ease of illustration, accounts are listed as a1-a6 and assignments are listed as p1-p6. Note, a practical example can have many more user accounts and assignments including different types. Also, for simplicity, assume that all relationships 'Has Assignments' are weighted the same.

For example, a use-case for assignment based communities:

Text representation:
(a1)-[:HAS_ASSIGNMENT]→(p1),
(a2)-[:HAS_ASSIGNMENT]→(p1),
(a3)-[:HAS_ASSIGNMENT]→(p1),
(a1)-[:HAS_ASSIGNMENT]→(p2),
(a2)-[:HAS_ASSIGNMENT]→(p2),
(a3)-[:HAS_ASSIGNMENT]→(p2),
(a1)-[:HAS_ASSIGNMENT]→(p3),
(a4)-[:HAS_ASSIGNMENT]→(p4),
(a5)-[:HAS_ASSIGNMENT]→(p4),
(a6)-[:HAS_ASSIGNMENT]→(p4),
(a4)-[:HAS_ASSIGNMENT]→(p5),
(a5)-[:HAS_ASSIGNMENT]→(p5),
(a6)-[:HAS_ASSIGNMENT]→(p5),
(a4)-[:HAS_ASSIGNMENT]→(p6),
(a5)-[:HAS_ASSIGNMENT]→(p6),
(a6)-[:HAS_ASSIGNMENT]→(p6);

Dimension-Vector Aggregation

To aggregate the communities, shift the relationship to a bitmap row-based matrix, where, e.g., rows are the accounts, and columns are the assignments:

|    | P1 | p2 | p3 | p4 | p5 | p6 |
|----|----|----|----|----|----|----|
| a1 | 1  | 1  | 1  | 0  | 0  | 0  |
| a2 | 1  | 1  | 0  | 0  | 0  | 0  |
| a3 | 1  | 1  | 0  | 0  | 0  | 0  |
| a4 | 0  | 0  | 0  | 1  | 1  | 1  |
| a5 | 0  | 0  | 0  | 1  | 1  | 1  |
| a6 | 0  | 0  | 0  | 1  | 1  | 1  |

Row Ri is identified as the assignment (or: dimension) DNA for account ai. For simplicity, all weights are the same (=1) in this matrix, but this does not necessarily need to be the case. Also, given domain knowledge, this is destined to be a sparse matrix.

In this example, there are three assignment-based communities:

| Index | Users      | Assignment Set |
|-------|------------|----------------|
| 0     | a1         | p1, p2, p3     |
| 1     | a2, a3     | p1, p2         |
| 2     | a4, a5, a6 | p4, p5, p6     |

For attributes, every account belongs to exactly one community. The assignment set combination is unique per community, but overlapping may occur. For example: p1, p2 belongs to both community 0 and community 1, but each assignment set combination is unique.

Relational Weight

After calculating the assignments communities, a connectivity rank (CR) is assigned to each assignment. The CR reflects the likelihood of two randomly selected accounts with the given assignment yield the same community ID (conditional probability).

$$CR(p_1)=P(a_i\cdot community==a_j\cdot community)|a_i$$
$$(p_i)==1 \wedge a_1(p_1)==1)$$

In the example above, $$CR(p_1) = \frac{\binom{2}{2}+\binom{2}{1}}{\binom{2}{3}} = \frac{1}{3}$$

$$CR(p_2) = \frac{\binom{2}{2}+\binom{2}{1}}{\binom{2}{3}} = \frac{1}{3}$$

$$CR(p_3) = \frac{\binom{2}{1}}{\binom{2}{1}} := 1$$

$$CR(p_4) = \frac{\binom{2}{3}}{\binom{2}{3}} := 1$$

$$CR(p_5) = \frac{\binom{2}{3}}{\binom{2}{3}} := 1$$

$$CR(p_6) = \frac{\binom{2}{3}}{\binom{2}{3}} := 1$$

The weight of assignment $p_i$ is defined as a linear transformation of the connectivity rank, and tuned as a hyper parameter per customer.

All weights meet the definition of $$weight(p_i)=\alpha \cdot CR(p_i)+\beta$$

For the trivial case $\alpha=0 \wedge \beta=1$, the weight for all $p_i$ is 1.

For the case $\alpha=1 \wedge \beta=0$, the weight for $p_i$ is exactly the same as the connectivity rank (CR).

The adjusted bit map per community is now:

| Index | Users | Assignment Set | P1 | P2 | p3 | p4 | p5 | p6 |
|---|---|---|---|---|---|---|---|---|
| 0 | a1 | p1, p2, p3 | 1/3 | 1/3 | 1 | 0 | 0 | 0 |
| 1 | a2, a3 | p1, p2 | 1/3 | 1/3 | 0 | 0 | 0 | 0 |
| 2 | a4, a5, a6 | p4, p5, p6 | 0 | 0 | 0 | 1 | 1 | 1 |

Directed Community Distance

The next step is to calculate the (asymmetric) distance among communities. The distance can include 1) Weight of assignments, 2) Tversky index, and/or 3) Community degree.

The definition of distance is as follows:

$$dist(c_i, c_j) = \begin{cases} \dfrac{\sum_{k_i(p_i)>0} |p_i|}{\sum_{k_i(p_i)>0 \wedge c_j(p_j)>} |p_i|}, & users(c_i) \le users(c_j) \\ \infty, & \text{Otherwise} \end{cases}$$

In words, given that community_i has less or equal users compared to community_j, the asymmetrical distance from community_i to community_j is the division of the summation of community_i assignments weights by summation of mutual assignments weights.

In the example, here is the matrix of all distance calculations:

| community index | 0 | 1 | 2 |
|---|---|---|---|
| 0 | 0 | 2.5 = dist(c0, c1) | 0 |
| 1 | ∞ | 0 | 0 |
| 2 | ∞ | ∞ | 0 |

By definition, a community i is considered at risk if:

$\exists j | 0 < dist(c_i, c_j) < \infty$

That is, not 0 and smaller than infinity. The base community for the risk is the one with the lowest non-zero distance value. In the example, community 0 is at risk with the base community 1.

Sorting Risks

Next, a risk score can be assigned for every peer in a detected community at risk, e.g., 0 to 100. The score factors can include 1) Ratio of extra granted assignments to the community at risk over the base group,
2) Count of Assignments in both communities,
3) Permitted actions that are at risk (this is calculated per user)—log scaled For example, the score can be Score($a_i$)=⅓·tanh(extra(assignments)/mutual(assignments))+⅓·tanh(extra(resources)/mutual(resources))+⅓·tanh(log$_{10}$(extra(permissions)/mutual(permissions)))

The tanh (hyperbolic tangent) is a function that values between [0,1]. Overall, this guarantees that the bottom risk score is always in range [0,100].

Unused, Abnormal User Account Detection Process

Figure 7:
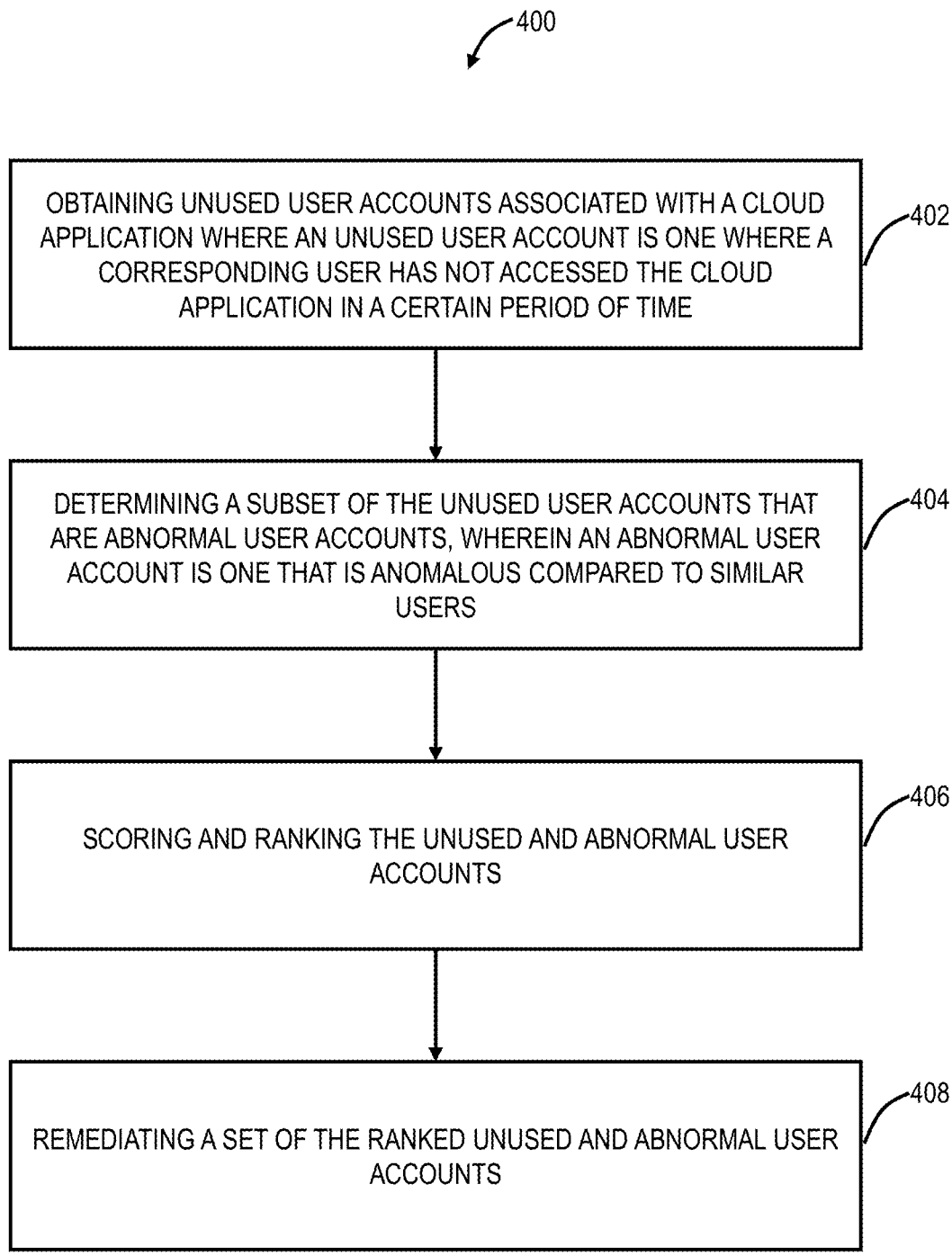
FIG. 7 is a flowchart of an unused, abnormal user account detection process.

FIG. 7 is a flowchart of an unused, abnormal user account detection process 400. The process 400 can be a computer-implemented method, implemented as instructions stored in a computer-readable medium and executed by one or more processors, or by an apparatus such as a node in the cloud-based system 100.

The process 400 includes obtaining unused user accounts associated with a cloud application where an unused user account is one where a corresponding user has not accessed the cloud application in a certain period of time (step 402); determining a subset of the unused user accounts that are abnormal user accounts, wherein an abnormal user account is one that is anomalous compared to similar users (step 404); scoring and ranking the unused and abnormal user accounts (step 406); and remediating a set of the ranked unused and abnormal user accounts (step 408).

The similar users are ones that have commonality in any of department, location, and job function, set of permissions, set of entitled resource actions, set of accessible assets etc., and wherein anomalous means a user has a close but different set of attributes as mentioned above corresponding similar users.

The abnormal user accounts are determined using a genetic algorithm. The genetic algorithm determines assignment based communities and determines a distance therebetween, with the abnormal user accounts being based on the distance. The genetic algorithm utilizes communities based on any of assignments, entitlements, behavior attributes, and meta attributes. The genetic algorithm utilizes a bipartite graph between users and assignments, converts the bipartite graph to a bitmap, determines communities based on the bitmap, computes a relational weight of each community, and computes distances among the community using the relational weight.

The scoring is based on a combination of extra granted assignments, assignment counts, and permitted actions.

CONCLUSION

It will be appreciated that some embodiments described herein may include one or more generic or specialized processors ("one or more processors") such as microprocessors; Central Processing Units (CPUs); Digital Signal Processors (DSPs); customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A method comprising:
   obtaining unused user accounts associated with a cloud application where an unused user account is one where a corresponding user has not accessed the cloud application in a certain period of time;
   determining a subset of the unused user accounts that are abnormal user accounts, wherein an abnormal user account is one that is anomalous compared to similar users;
   scoring and ranking the unused and abnormal user accounts, wherein the scoring is based on a combination of extra granted assignments, assignment counts, and permitted actions; and
   remediating a set of the ranked unused and abnormal user accounts.

2. The method of claim 1, wherein the similar users are ones that have commonality in any of department, location, and job function, and wherein anomalous means a user has different permissions from corresponding similar users.

3. The method of claim 1, wherein the abnormal user accounts are determined using a genetic algorithm.

4. The method of claim 3, wherein the genetic algorithm determines assignment based communities and determines a distance therebetween, with the abnormal user accounts being based on the distance.

5. The method of claim 3, wherein the genetic algorithm utilizes communities based on any of assignments, entitlements, behavior attributes, and meta attributes.

6. The method of claim 3, wherein the genetic algorithm utilizes a bipartite graph between users and assignments, converts the bipartite graph to a bitmap, determines communities based on the bitmap, computes a relational weight of each community, and computes distances among the community using the relational weight.

7. A non-transitory computer-readable medium comprising instructions that, when executed, cause a processing device to perform the steps of:
   obtaining unused user accounts associated with a cloud application where an unused user account is one where a corresponding user has not accessed the cloud application in a certain period of time;
   determining a subset of the unused user accounts that are abnormal user accounts, wherein an abnormal user account is one that is anomalous compared to similar users;
   scoring and ranking the unused and abnormal user accounts, wherein the scoring is based on a combination of extra granted assignments, assignment counts, and permitted actions; and
   remediating a set of the ranked unused and abnormal user accounts.

8. The non-transitory computer-readable medium of claim 7, wherein the similar users are ones that have commonality in any of department, location, and job function, and wherein anomalous means a user has different permissions from corresponding similar users.

9. The non-transitory computer-readable medium of claim 7, wherein the abnormal user accounts are determined using a genetic algorithm.

10. The non-transitory computer-readable medium of claim 9, wherein the genetic algorithm determines assignment based communities and determines a distance therebetween, with the abnormal user accounts being based on the distance.

11. The non-transitory computer-readable medium of claim 9, wherein the genetic algorithm utilizes communities based on any of assignments, entitlements, behavior attributes, and meta attributes.

12. The non-transitory computer-readable medium of claim 9, wherein the genetic algorithm utilizes a bipartite graph between users and assignments, converts the bipartite graph to a bitmap, determines communities based on the bitmap, computes a relational weight of each community, and computes distances among the community using the relational weight.

13. A non-transitory computer-readable medium comprising instructions that, when executed, cause a processing device to perform the steps of:
   obtaining unused user accounts associated with a cloud application where an unused user account is one where a corresponding user has not accessed the cloud application in a certain period of time;
   determining a subset of the unused user accounts that are abnormal user accounts, wherein an abnormal user account is one that is anomalous compared to similar users and the abnormal user accounts are determined using a genetic algorithm;
   scoring and ranking the unused and abnormal user accounts; and
   remediating a set of the ranked unused and abnormal user accounts,
   wherein the genetic algorithm utilizes a bipartite graph between users and assignments, converts the bipartite graph to a bitmap, determines communities based on the bitmap, computes a relational weight of each community, and computes distances among the community using the relational weight.

14. The non-transitory computer-readable medium of claim 13, wherein the similar users are ones that have commonality in any of department, location, and job function, and wherein anomalous means a user has different permissions from corresponding similar users.

15. The non-transitory computer-readable medium of claim 13, wherein the genetic algorithm determines assignment based communities and determines a distance therebetween, with the abnormal user accounts being based on the distance.

16. The non-transitory computer-readable medium of claim 13, wherein the genetic algorithm utilizes communities based on any of assignments, entitlements, behavior attributes, and meta attributes.

17. The non-transitory computer-readable medium of claim 13, wherein the scoring is based on a combination of extra granted assignments, assignment counts, and permitted actions.

\* \* \* \* \*